(12) United States Patent
McKinnon et al.

(10) Patent No.: US 7,871,109 B1
(45) Date of Patent: Jan. 18, 2011

(54) DRAIN BASIN WITH PIPE COUPLINGS

(75) Inventors: James Stephen McKinnon, Colleyville, TX (US); Carl Ryan Whitmarsh, Tulsa, OK (US)

(73) Assignee: DFW Alliance Corp., Saginaw, TX (US)

( * ) Notice: Subject to any disclaimer, the term of this patent is extended or adjusted under 35 U.S.C. 154(b) by 623 days.

(21) Appl. No.: 11/496,097

(22) Filed: Jul. 31, 2006

(51) Int. Cl.
*F16L 25/00* (2006.01)
(52) U.S. Cl. ............... 285/12; 285/133.3; 285/148.22; 285/319; 285/331; 285/903
(58) Field of Classification Search ............ 285/5, 285/7, 12, 133.11, 133.3, 133.5, 148.22, 285/148.23, 319, 331, 903, 921; 405/36
See application file for complete search history.

(56) References Cited

U.S. PATENT DOCUMENTS

| | | | | |
|---|---|---|---|---|
| 2,966,372 A | * | 12/1960 | Phillips | 285/39 |
| 3,368,830 A | | 2/1968 | French | |
| 3,471,179 A | * | 10/1969 | Sixt | 285/148.22 |
| 3,670,894 A | | 6/1972 | Friedl | |
| 3,695,643 A | | 10/1972 | Schmunk | |
| 3,897,090 A | * | 7/1975 | Maroschak | 285/260 |
| 4,173,989 A | | 11/1979 | Prest | |
| 4,247,136 A | * | 1/1981 | Fouss et al. | 285/319 |
| 4,286,808 A | * | 9/1981 | Fouss et al. | 285/140.1 |
| 4,440,406 A | * | 4/1984 | Ericson | 277/607 |
| 4,441,745 A | | 4/1984 | Nicholas | |
| 4,575,133 A | * | 3/1986 | Nattel | 285/319 |
| 4,660,860 A | | 4/1987 | Todd | |
| 4,688,833 A | | 8/1987 | Todd | |
| 4,774,940 A | * | 10/1988 | Linder | 128/204.18 |
| 5,087,084 A | * | 2/1992 | Gehring | 285/319 |
| 5,174,610 A | * | 12/1992 | Svendsen et al. | 285/13 |
| 5,346,264 A | * | 9/1994 | Law et al. | 285/136.1 |
| 5,560,163 A | | 10/1996 | Carlton | |
| 5,634,311 A | | 6/1997 | Carlton | |
| 5,689,921 A | | 11/1997 | Carlton | |
| D389,562 S | | 1/1998 | Picton | |
| D402,013 S | * | 12/1998 | Saffrey | D23/263 |
| 5,846,412 A | * | 12/1998 | Tharp | 210/220 |
| 5,921,586 A | | 7/1999 | Prassas et al. | |
| 6,007,110 A | * | 12/1999 | Amatsutsu | 285/239 |
| 6,226,937 B1 | | 5/2001 | Carlton | |
| 6,994,382 B2 | * | 2/2006 | Peterson et al. | 285/401 |
| 7,303,357 B2 | * | 12/2007 | Villarreal et al. | 405/36 |
| 2006/0001266 A1 | * | 1/2006 | Peterson et al. | 285/903 |

* cited by examiner

*Primary Examiner*—James M Hewitt
*Assistant Examiner*—Jay R Ripley
(74) *Attorney, Agent, or Firm*—Geoffrey A. Mantooth

(57) ABSTRACT

A drain basin has a basin with walls and a cavity therein. The basin can have one or more sleeves coupled thereto. The sleeves are in communication with the cavity. The sleeves form pipe couplings to the basin. Each sleeve has a free end and a fixed end. The fixed end is coupled to the basin. The sleeve has an inside diameter that decreases toward the fixed end, which inside diameter is structured and arranged to receive the outside diameter of a small pipe. The sleeve also has an outside diameter that increases toward the fixed end, which outside diameter is structured and arranged to receive the inside diameter of a larger pipe. In addition, catches are provided to couple a corrugated pipe to the sleeve. The catches comprise fingers that flex or projections on ribs. Thus, the drain basin allows several diameters of several different pipes to be coupled to the drain basin.

4 Claims, 8 Drawing Sheets

DRAIN BASIN WITH PIPE COUPLINGS

FIELD OF THE INVENTION

The present invention relates generally to drain basins equipped with couplings for drain pipes.

BACKGROUND OF THE INVENTION

Good water drainage in a landscape may be as important as proper irrigation. Too much water in landscaped areas can result in numerous plant diseases, and can even kill sensitive plants. Overly wet turf areas are prone to soil compaction and scarring from foot prints and mowing equipment.

Drainage around building foundations is important to prevent leaks and moisture intrusion into building foundations, basements, and walls. Controlling water around a foundation can prevent or reduce foundation movement and the buildup of mold and fungus inside the building. Thus, controlling run off water preserves the value of the building and its landscape.

To control run off, surface drainage systems are used to collect excess surface water from flower beds, turf areas, and other similar low lying areas where run off water tends to collect. Water enters a surface drainage system through catch basins, which are set in the ground to collect water. A drainage grate covers the opening of a catch basin to prevent debris from entering and to provide a surface to support pedestrian or vehicle traffic in the yard or garden.

Catch basins connect to underground pipes that move the water downhill and away from the drained areas, where it may be released from an outlet in a location appropriate for the excess water. Several types of drainage pipe may be used in landscape drainage systems, including smooth wall pipes made from plastic, such as polyvinyl chloride (PVC), and corrugated plastic pipes made from high density polyethylene (HDPE). In addition to the different types or shapes, the drainage pipes are also available in different diameters.

Because there may be different kinds of pipes and different sizes of pipes used in a drainage system, landscaping contractors and their suppliers usually need to stock several different types of catch basins in order to connect to the different types of pipes. In any business, when the number of parts in inventory increases, the cost of stocking increases. Time and money may be wasted when contractors at the job site realize that the catch basins they have on site will not connect to the type or size of drain pipe at the site, making it necessary to run to the supplier to pick up a catch basin that fits the pipe.

Additionally, catch basins may be configured with more than one drain pipe connector or coupling, which provides more than one water inlet or outlet. If a landscape designer wants to connect to a first type or diameter of pipe to a first coupling, and a second type or diameter of pipe to a second coupling, the landscape supplier and contractor may have to stock yet another custom catch basin with the desired combination of inlet and outlet couplings.

Thus, there is a need for an improved coupling for drain pipes that can couple to different types and sizes of drain pipe, thereby eliminating the requirement of stocking a large variety of catch basins, and providing landscape designers and landscape contractors with options for connecting several sizes and types of pipe to the same coupling, and options in specifying the type of pipe connected to a particular catch basin.

BRIEF SUMMARY OF THE INVENTION

The present invention provides a drain basin that comprises a basin having basin walls and a cavity therein. A sleeve is coupled to one of the basin walls and is in communication with the cavity. The sleeve has a free end and a fixed end, with the fixed end coupled to the basin. The sleeve has an inside diameter that decreases toward the fixed end, the sleeve inside diameter is structured and arranged to receive the outside diameter of a small pipe. The sleeve has an outside diameter that increases toward the fixed end. The sleeve outside diameter is structured and arranged to receive the inside diameter of a larger pipe. A finger protrudes radially from the sleeve. The finger is flexible so as to move radially in and out. The finger is structured and arranged to couple a corrugated pipe to the sleeve.

In accordance with one aspect of the present invention, the basin has a top end that receives a grate.

In accordance with another aspect of the present invention, the finger protrudes radially in.

In accordance with still another aspect of the present invention, the sleeve comprises inner projections spaced circumferentially, which inner projections form the inside diameter that decreases toward the fixed end.

In accordance with still another aspect of the present invention, the sleeve comprises outer projections spaced circumferentially, which outer projections form the outside diameter that increases toward the fixed end.

In accordance with still another aspect of the present invention, the sleeve comprises a second outside diameter that increases toward the fixed end. The outer projections extend radially from the second outside diameter.

In accordance with still another aspect of the present invention, the sleeve comprises projections space circumferentially. Each of the projections comprising first and second steps, with the second step projecting radially further than the first step. The projection second step forming one of the inside diameter that decreases toward the fixed end or the outside diameter that increases toward the fixed end.

In accordance with still another aspect of the present invention, the projections form ribs, with the ribs having a catch for corrugated pipe.

In accordance with still another aspect of the present invention, the finger is a first finger that protrudes radially in. A second finger protrudes radially out.

The present invention also provides a drain basin, which basin has basin walls and a cavity therein. A sleeve is coupled to one of the basin walls and is in communication with the cavity. The sleeve has a free end and a fixed end. Ribs are spaced circumferentially spaced about the sleeve. The ribs change a diameter of the sleeve from the free end to the fixed end. The ribs comprising projections for catching corrugated pipe.

In accordance with another aspect of the present invention, the ribs are on an outside of the sleeve. The ribs form an outside diameter that increases toward the fixed end.

In accordance with still another aspect of the present invention, the sleeve comprises a second outside diameter that increases toward the fixed end. The ribs extending radially from the second outside diameter.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DESCRIPTION OF THE PREFERRED EMBODIMENTS

Figure 1:
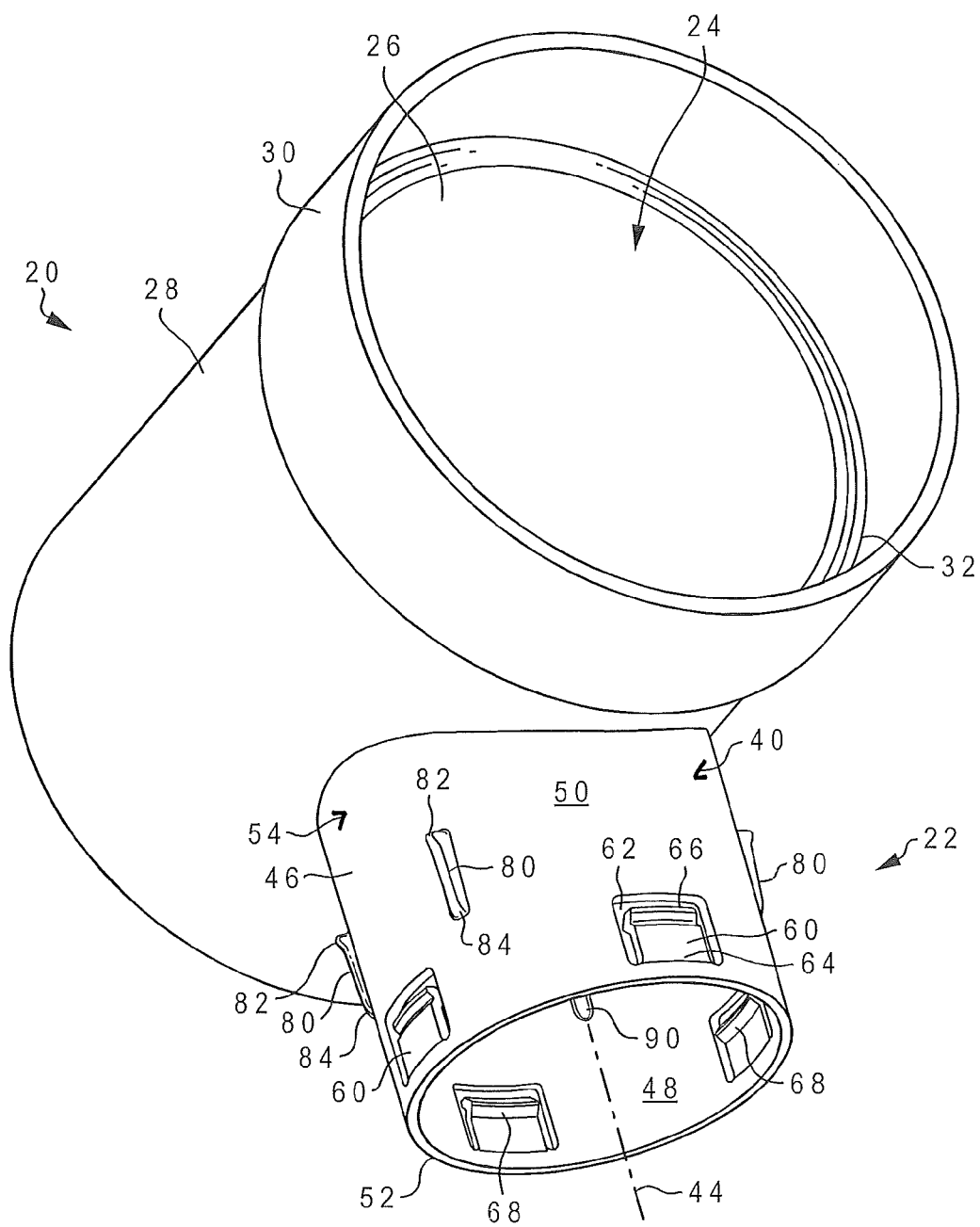
FIG. 1 is a perspective view of the drain basin and a drain pipe coupling of the present invention in accordance with a preferred embodiment.

With reference now to the drawings, and in particular with reference to FIG. 1, there is depicted catch basin, or drain basin, 20 having drain pipe coupling 22, which is configured and adapted to connect to different types and sizes of drain pipe in accordance with the present invention. As illustrated, catch basin 20 includes a drain grate opening 24, which opens into basin cavity 26 defined by basin walls 28. The basin walls are the side wall or walls and the bottom wall. Any shape could be adopted for basin cavity 26 and basin walls 28, but in a typical configuration, basin cavity 26 is cylindrical, as shown in FIG. 1, or cuboid. Basin walls 28 in FIG. 1 are cylindrical on the sides and circular at the bottom of catch basin 20. The basin could also be rectangular, wherein the basin walls would be the side walls and the bottom wall. The basin could be bowl shaped wherein the basin walls would be the merger of side and bottom walls, or in essence a single wall.

Catch basin 20 may have a drain grate rim 30 around drain grate opening 24 for receiving and holding a drain grate (not shown) to cover opening 24. The innermost portion of drain grate rim 30 may include a ledge 32 that provides support for the drain grate in the drain grate opening 24.

In order for water to move into or out of catch basin 20, a drain pipe is coupled to drain pipe coupling 22. Drain pipe coupling 22 includes features that are adapted to receive and mechanically couple to different types of drain pipe, and different sizes of each type of drain pipe. For example, drain pipe coupling 22 is designed to receive at least two sizes or diameters of two types of drain pipe, which types include a smooth wall pipe and a corrugated pipe.

Figure 2:
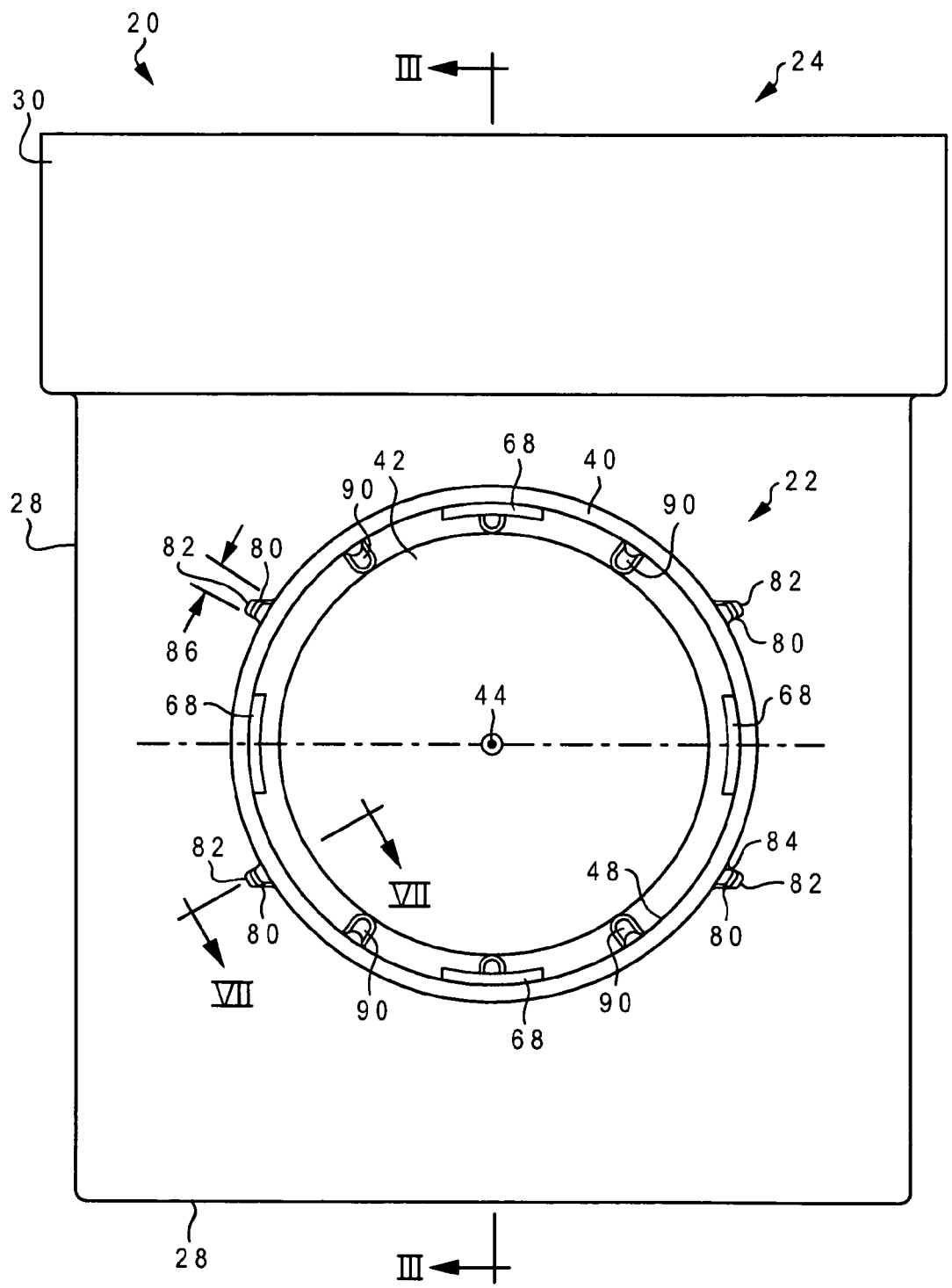
FIG. 2 is an front elevation view of the drain basin of FIG. 1 showing the pipe coupling.
Figure 3:
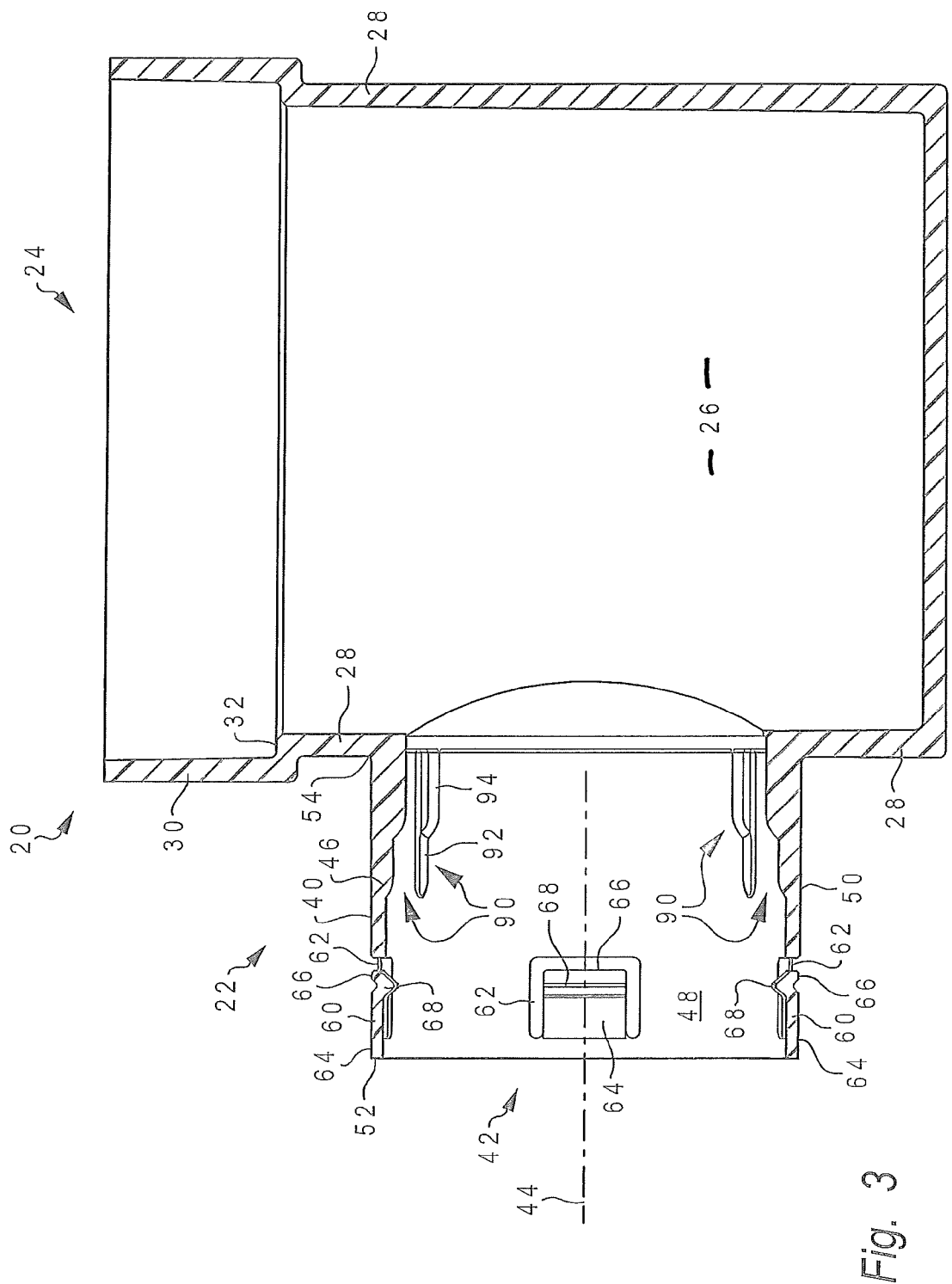
FIG. 3 is a cross-sectional view of the drain basin and pipe coupling of FIG. 2 taken along line
Figure 4:
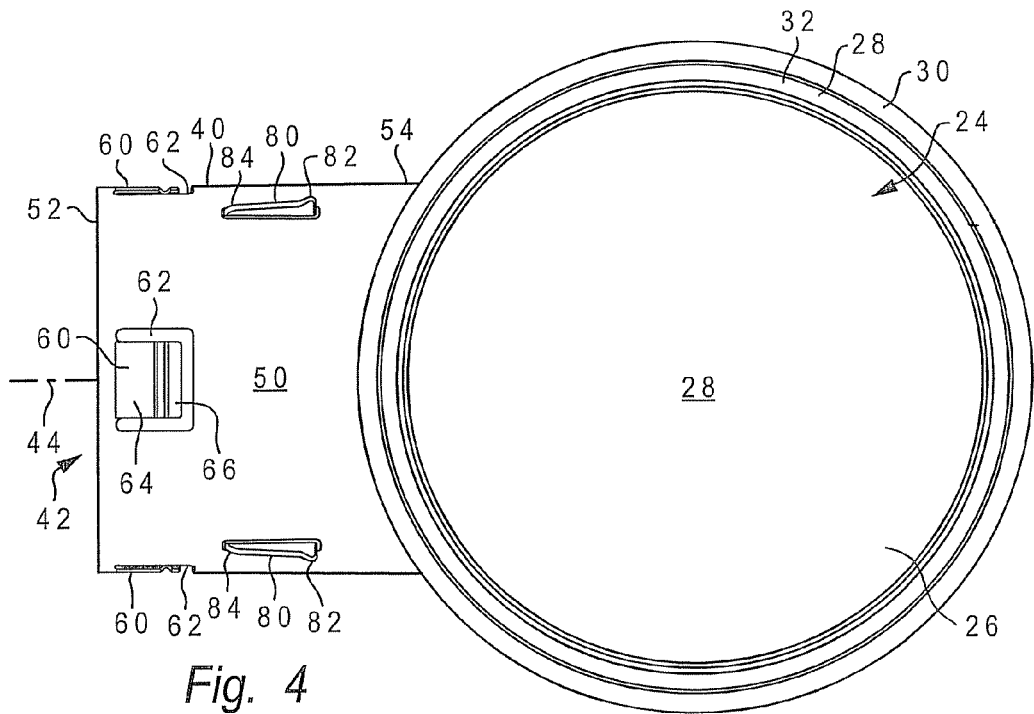
FIG. 4 is a top plan view of the drain basin and pipe coupling of FIG. 2.

Referring to FIGS. 1-3, drain pipe coupling, or sleeve, 22 is generally tubular or cylindrically shaped, as illustrated by tubular body 40, having opening 42 that extends through the body 40. Tubular body 40 is concentric with and extends along coupling axis 44, which is an imaginary reference line through the center of tubular body 40. Tubular body 40 comprises tube wall 46, which has an inside surface 48 and an outside surface 50.

As directional reference, tubular body 40 may be said to have a pipe receiving end, or free end, 52 and a fixture end, or fixed end, 54. Pipe receiving end 52 receives a drainage pipe for mechanical coupling, while fixture end 54 is securely fixed in place relative to another structure, such as catch basin 20. In the embodiments shown in the figures, fixture end 54 is integrated with, and is a constituent part of, catch basin 20. Alternatively, the pipe coupling 22 could removably be attached to the drain basin 20.

To provide a secure mechanical coupling with a corrugated drain pipe, drain pipe coupling 22 includes a plurality of cantilevered fingers, or tabs, 60 that catch and engage a ridge in the corrugated wall of the drain pipe. Cantilevered fingers 60 are formed by openings 62 in tube wall 46. Openings 62 are typically U-shaped and pass completely through tube wall 46 from inside surface 48 to outside surface 50. Thus, the shape of cantilevered fingers 62 is related to and determined by the shape of openings 62. In a preferred embodiment, cantilevered fingers 60 and openings 62 are completely surrounded by tube wall 46, wherein cantilevered fingers 60 and openings 62 do not extend all the way to, nor are they open to, pipe receiving end 52.

In a preferred embodiment, cantilevered fingers 60 are rectangular, although they could be other shapes. Cantilevered fingers 62 are attached to tube wall 46 at connected end 64, and free end 66 is surrounded by opening 62. In a preferred embodiment, free end 66 is nearer fixture end 54 and is opposite connected end 64, which is nearer pipe receiving end 52. Alternatively, the free end 66 could be nearer the pipe receiving end 52 than is connected end 64. Free end 66 of cantilevered finger 60 is free to move radially inward and outward with respect to coupling axis 44 as the material of tube wall 46 will allow bending or deforming of finger 60. The fingers 60 are integral with the tube wall 46. The force required to bend cantilevered finger 60 depends upon the material of tube wall 46, the thickness of the joint between the finger 60 and the tube wall 46 at the connected end 64, the width of finger 60, and the length of finger 60 between connected end 64 and free end 66.

Figure 6:
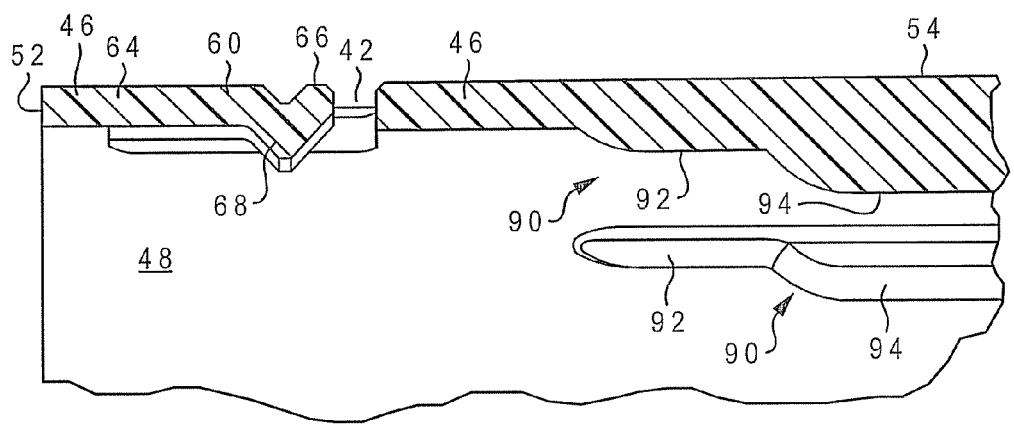
FIG. 6 is a detail cross-sectional view of the pipe coupling of FIG. 3.

Referring to FIGS. 2 and 6, each cantilevered finger 60 includes an inward protrusion 68, which is proximate or near free end 66 of finger 60 and extends radially inward toward coupling axis 44 beyond the inside surface 48 of tube wall 46. Thus, inward protrusion 68 extends into opening 42, or the cavity defined by tubular body 40. The purpose of inward protrusion 68 is to engage a ridge on the outside surface of a corrugated wall small diameter drain pipe, as illustrated in FIG. 10.

Figure 10:
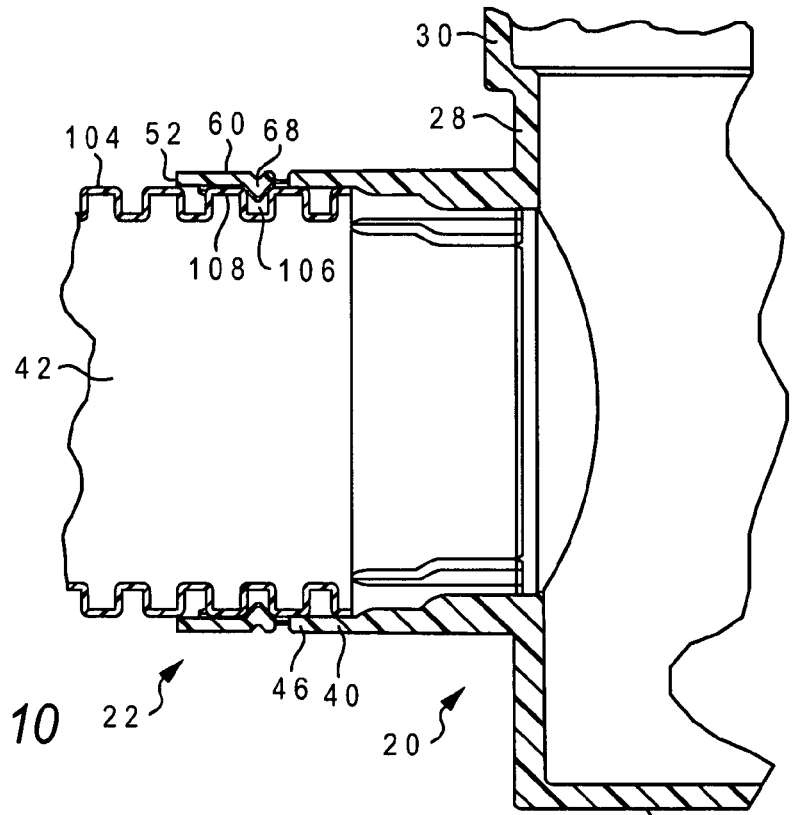
FIG. 10 is a cross-sectional view of the drain basin and pipe coupling of FIG. 2 with a small diameter corrugated pipe coupled to the inside of the pipe coupling.

With reference now to FIG. 10, there is depicted a cross-sectional view of drain pipe coupling 22 (taken along line III-III in FIG. 2), which is coupled to small diameter corrugated pipe 104. As illustrated, pipe 104 is inserted into opening 42 wherein inward protrusion 68 on cantilevered fingers 60 protrude into grooves 106, and engage adjacent ridges 108 in order to maintain pipe 104 within drain pipe coupling 22. An example of small diameter corrugated drain pipe 104 is a 3 inch pipe that is conventional and commercially available.

To accommodate a connection to a larger diameter corrugated wall drain pipe, drain pipe coupling 22 preferably includes outer ribs 80 (See FIG. 1), which are circumferentially spaced apart around outside surface 50 of tubular body 40 (See FIG. 2). Outer ribs 80 extend radially outward beyond outside surface 50 of tube wall 46.

Figure 7:
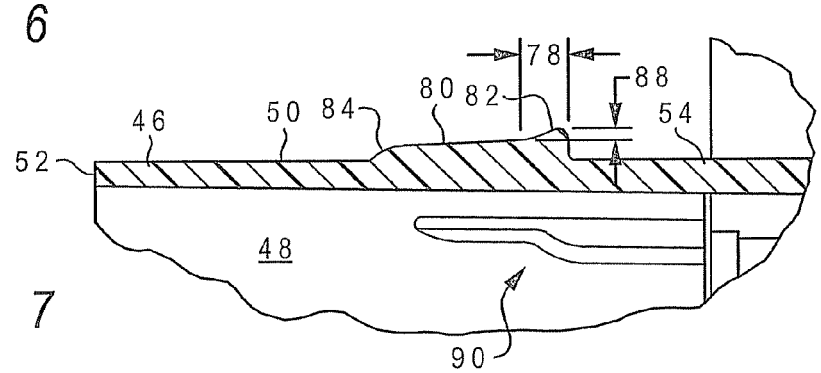
FIG. 7 is a cross-sectional view of the pipe coupling of FIG. 2 taken along line VII-VII.
Figure 11:
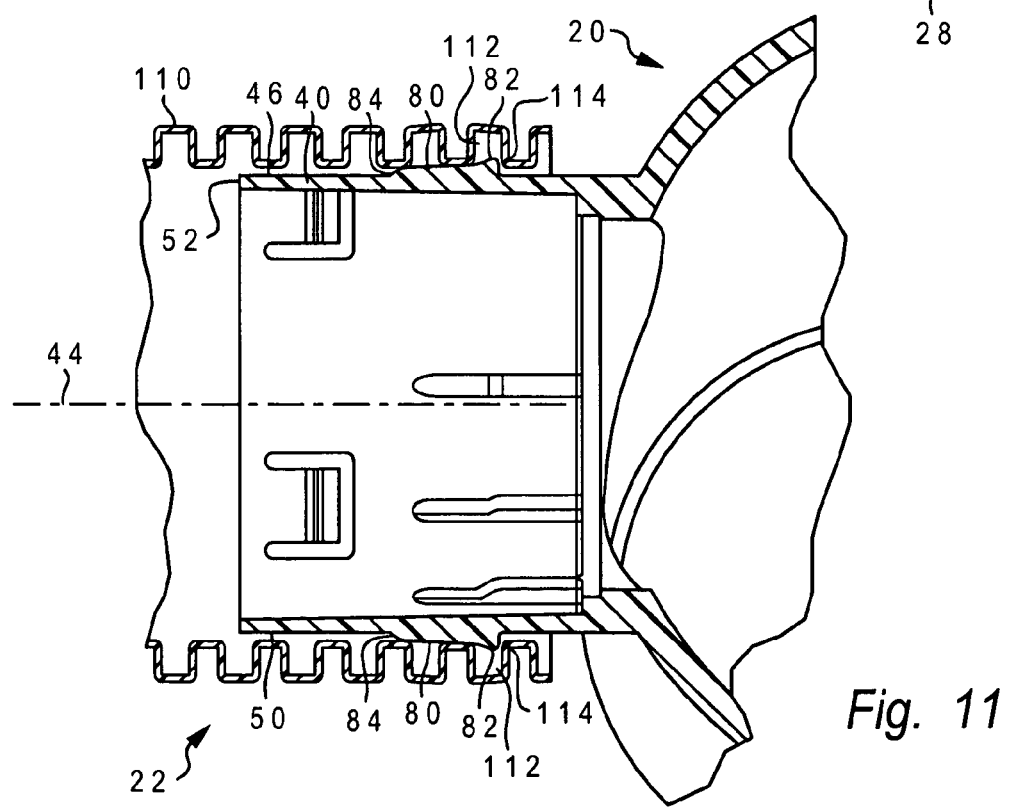
FIG. 11 is a cross-sectional view of the drain basin and pipe coupling of FIG. 2 with a large diameter corrugated pipe coupled on the outside of the pipe coupling.

Engaging and securing a corrugated wall drain pipe, outer ribs 80 include nubs 82 (see FIGS. 7 and 11) that extend into a groove and engage an adjacent ridge of the inside surface of a large diameter corrugated pipe. As shown in FIG. 11, a larger diameter corrugated wall drain pipe 110 has been installed over tubular body 40, wherein nubs 82 of outer ribs 80 protrude into grooves 112 and engage ridge 114 in order to secure pipe 110 to catch basin 20. As pipe 110 slides over tubular body 40, the end opening of pipe 110 moves past ridge ends 84 and slides on outer ribs 80 until encountering nubs 82. With continuing force applied on pipe 110, an inside ridge 114 will expand or deform and snap over nubs 82. After ridge 114 snaps past nubs 82, pipe 110 is engaged and coupled to coupling 22. The snapping action provides the user with positive tactile feedback indicating that a secure connection has been made.

In order to make it easier to install large diameter corrugated pipe 110, ribs 80 are sloped downward toward coupling axis 44 as the rib extends from nub 82 toward ridge end 84, which ridge end 84 is nearer pipe receiving end 52. Ridge end 84 is radiused so that it will not inadvertently catch on inside ridges 114 of corrugated pipe 110 as the corrugated pipe is sliding along outside surface 50 of coupling 22.

In a preferred embodiment, outer ribs 80 have a width, as indicated at reference numeral 86 in FIG. 2. Nub 82 preferably extends above the top of rib 80 by some distance, as indicated at reference numeral 88 in FIG. 7. The length 78 of nub 82 measured parallel to coupling axis 44 is smaller than the distance between ridges 114 of large corrugated pipe 110. In a preferred embodiment, there are four outer ribs 80 circumferentially spaced about the coupling 22.

In the embodiment shown in FIG. 1, outer ribs 80 extend from ridge ends 84, which are co-planar in a plane perpendicular to coupling axis 44. Nubs 82 are also co-planar in another plane perpendicular to axis 44, nearer fixture end 54.

Figure 9:
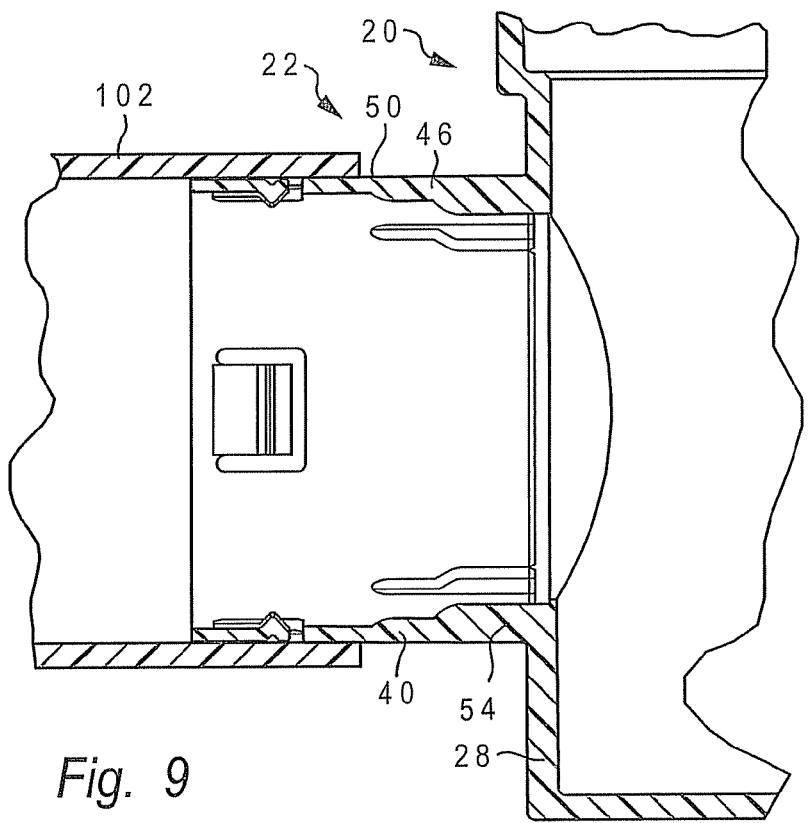
FIG. 9 is a cross-sectional view of the drain basin and pipe coupling of FIG. 2 with a large diameter smooth-walled pipe coupled on the outside of the pipe coupling.

In a preferred embodiment, ridge ends 84 are spaced back away from receiving end 52 in order to provide an area on tubular body 40 for receiving and coupling to a large diameter smooth wall pipe, which pipe will cover and contact portions of outside surface 50 in the region between ridge end 84 and pipe receiving end 52, as shown in FIG. 9. Tubular body 40 has a slight draft, or taper, wherein the diameter of tube body 40 is smaller at pipe receiving end 52 than at fixture end 54. This draft is preferably 1°, which ensures an interference fit with larger diameter smooth wall pipe 102 (see FIG. 9).

Referring to FIGS. 2 and 6, inside tubular body 40, inner ribs 90 are provided on inside surface 48 of tube wall 46 to form a tight interference fit, or friction fit, between a smaller diameter smooth wall pipe and drain pipe coupling 22. Inner ribs 90 are longitudinally oriented with respect to coupling axis 44 (See FIG. 3), and are angularly spaced apart with respect to coupling axis 44 on inside surface 48 (See FIG. 2). Inner ribs 90 extend radially inward toward coupling axis 44 beyond inside surface 48 of tube wall 46.

In a preferred embodiment, inner ribs 90 have portions or segments having different heights. For example, inner ribs 90 have a lower raised portion 92 and a higher raised portion 94 (See FIG. 6). These lower and higher portions of inner ribs 90 are designed and adapted to accept and couple to the outside surfaces of smooth walled pipe having two different diameters, as discussed in greater detail below with respect to FIG. 8. Both lower raised portion 92 and higher raised portion 94 have rounded ends so that the end of a drain pipe does not catch as a pipe is being inserted into drain pipe coupling 22.

Inner ribs 90 are preferably spaced back from pipe receiving end 52 toward fixture end 54 so that a smooth wall pipe may be inserted some distance into opening 42 before engaging inner ribs 90. This allows the user to align a drain pipe more closely with coupling axis 44 before engaging inner ribs 90 in an interference fit.

Figure 8:
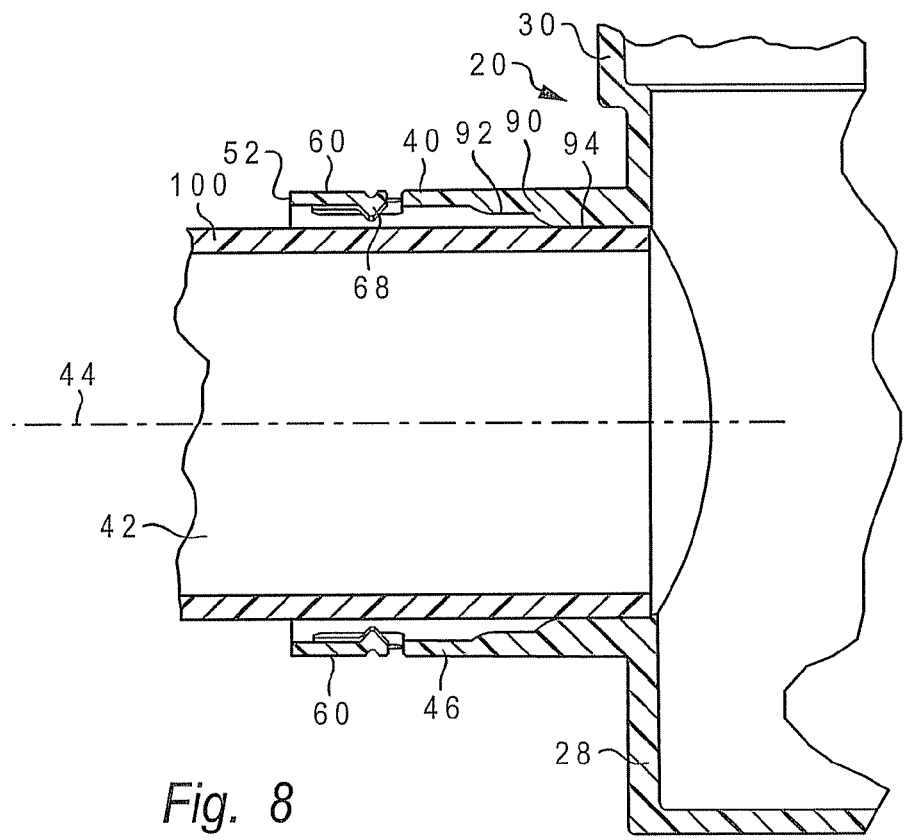
FIG. 8 is a cross-sectional view of the drain basin and pipe coupling of FIG. 2 with a small diameter smooth-walled pipe coupled to the inside of the pipe coupling.

Referring now to FIG. 8, there is depicted a portion of a cross sectional view of catch basin 20 with a small diameter smooth wall drain pipe 100 inserted into drain pipe coupling 22. Pipe 100 is of a smaller diameter than is pipe 102, shown in FIG. 9. An example of small diameter smooth wall pipe 103 is 3 inch pipe which is conventional and commercially available. The outside surface of pipe 100 contacts and engages in a friction fit with higher raised portions 94 of inner ribs 90. Lower raised portions 92 of inner ribs 90 are adapted and configured to similarly receive and provide an interference fit with a slightly larger diameter smooth wall pipe (not shown), which is also conventional and commercially available.

When pipe 100 is installed inside opening 42, cantilevered fingers 60 may be bent radially outward from coupling axis 44 as the outside walls of pipe 100 contact inward protrusion 68. The leading edge of inward protrusion 68, which is closer to pipe receiving end 52, may be sloped at an angle so that pipe 102 will push inward protrusions 68 radially outward and slide past inward protrusions 68.

Referring now to FIG. 9, there is depicted a portion of a cross-sectional view of catch basin 20 coupled to large diameter smooth wall pipe 102. Pipe 102 is installed over the outside of tubular body 40 wherein the inside walls of pipe 102 contact and engage in an interference fit with outside surface 50 of tube wall 46. The interference fit occurs prior to pipe 102 contacting ridge ends 84 (See FIG. 7). The slight taper in outside diameter of the tubular body 40 aids in establishing an interference fit as the large diameter pipe 102 is pushed further on the tubular body 40.

To install the drain or catch basin, a hole is dug in the ground. Trenches are made for the pipe. The catch basin is inserted into its hole, with the tubular body oriented toward the pipe trench. Pipe is placed in the trench and connected to the catch basin. Corrugated pipe is used in some installations, while smooth wall pipe is used in other installations. The diameter of the pipe is typically selected for its water carrying capacity; larger pipes can carry more water than smaller diameter pipes. To connect the pipe, the end of the pipe is pushed into (for small diameter pipes) or onto (for larger diameter pipes) the tubular body to either catch or engage the projections 68, 82 or to form an interference fit with the inner or outer ribs 80, 90. Because the pipes are drain pipes and the ground surrounding the pipe is already likely to be wet, there is no need for a seal between the pipe and the catch basin. A grate is installed into the top of the catch basin.

Figure 12:
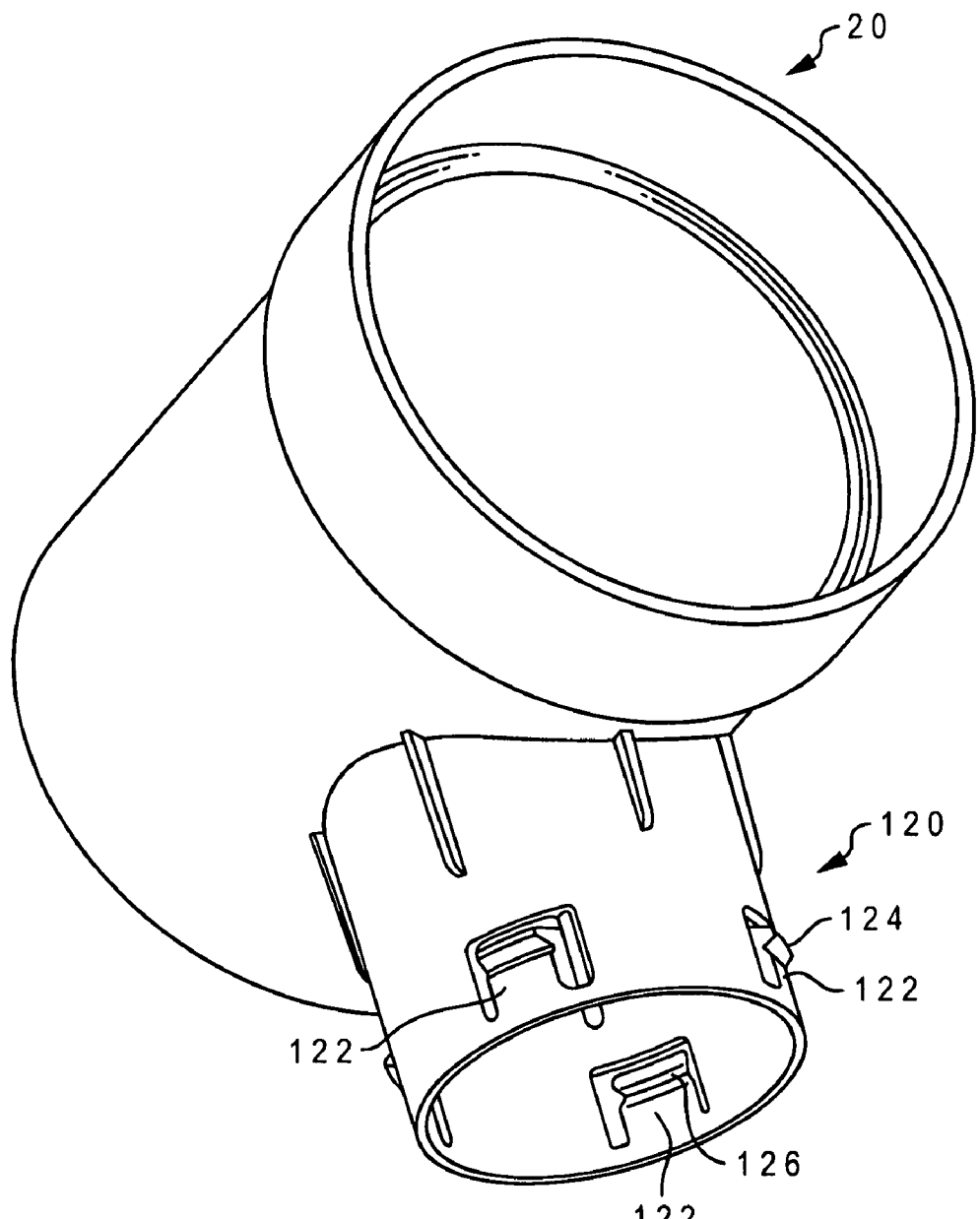
FIG. 12 is a perspective view of an alternate embodiment of a drain basin and pipe coupling in accordance with the present invention.

FIG. 12 shows an alternative embodiment of a drain pipe coupling in accordance with the present invention. As illustrated, catch basin 20 includes drain pipe coupling 120, which includes cantilevered fingers 122 that have outward protrusions 124 as well as inward protrusions 126. Outward protrusions 124 are configured and adapted to engage ridges inside a large diameter corrugated pipe 110 (see FIG. 11), and inward protrusions 126 are configured and adapted to engage outside ridges on a small diameter of corrugated pipe 104 (see FIG. 8). Thus, in the alternative embodiment illustrated, cantilevered fingers 122 have both inward and outward protrusions for engaging ridges of large and small diameter corrugated pipe, respectively.

Catch basin 20 and drain pipe coupling 22 of the present invention are made, in the preferred embodiment, from plastic that has been molded by an injection molding process.

Figure 5:
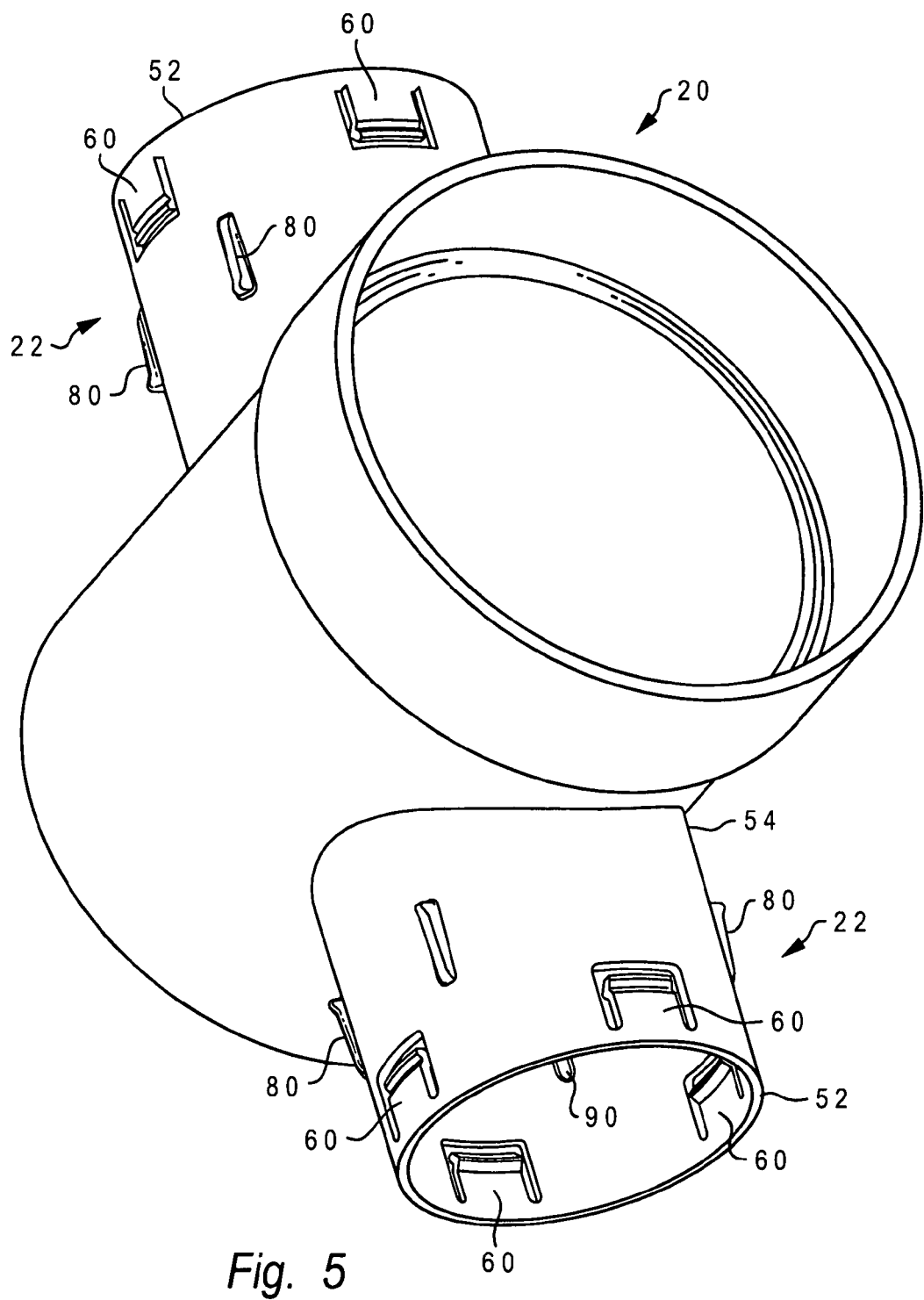
FIG. 5 is a perspective view of a drain basin in accordance with another embodiment.

Referring to FIG. 5, in yet another embodiment of the present invention, the catch basin 20 can have more than one drain pipe coupling 22. In FIG. 5, there are shown two drain pipe couplings, diametrically opposed tone another (180 degrees apart). The pipe couplings 22 can be at any angle about the circumference of the catch basin, such as 90 degrees apart. Also, the two pipe couplings in FIG. 5 are coaxially aligned. However, one pipe coupling can be lower (or further from the grate rim 30) than the other pipe coupling. By using the embodiment of FIG. 5, drain pipes of two different diameters, or two types of drain pipe, may be connected to one another.

In addition to a coupling that connects one pipe to another, the drain pipe coupling 22 of the present invention may be used as part of a separate coupling adaptor that can be inserted in, and connected to, a larger, typically circular opening in a generic catch basin. Such a coupling adapter may be inserted into the opening and turned in order to securely engage the opening in the wall of the catch basin.

Persons skilled in the art should appreciate that the drain pipe coupling of the present invention provides a versatile coupling for connecting drain pipe of different diameters and different types, including smooth wall drain pipe and corrugated drain pipe. The versatile coupling of the present invention allows landscape contractors and their suppliers to reduce the number of parts stocked in inventory while still having parts that connect to different types of pipe in different diameters. Where multiple couplings are used on the same catch basin or pipe coupling, the present invention can perform an adapter function by connecting to two different types of pipe, or two different diameters of pipe, which provides versatility in designing new drainage systems, or versatility in coupling to an existing drainage system.

Smooth wall pipe is secured to the pipe coupling by interference fits. The diameter of the pipe coupling changes from the free end to the fixed end. In one embodiment, the diameter change is accomplished with projections or ribs (see FIG. 8). In another embodiment, the diameter change is accomplished by tapering the pipe coupling wall thickness (see FIG. 9). Corrugated pipe is secured to the pipe coupling by catches. The catches can be fixed, such as in FIG. 11, or flexible, such as is in FIG. 10.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A drain basin comprising:
a) a basin having basin walls and a cavity therein;
b) a sleeve coupled to one of the basin walls and in communication with the cavity;
c) the sleeve having a free end and a fixed end and an inside and an outside, the fixed end coupled to the basin, the sleeve having a central axis that extends between the free end and the fixed end, the sleeve having ribs on the inside and the outside, the ribs oriented with a central axis of the sleeve, the ribs spaced circumferentially about the sleeve, the sleeve having an inside diameter that decreases toward the fixed end, the sleeve inside diameter structured and arranged to receive the outside of a small pipe, the sleeve having an outside diameter that increases toward the fixed end, the sleeve outside diameter structured and arranged to receive the inside of a larger pipe,
d) a finger having a protrusion that protrudes radially from the sleeve, the finger being flexible so as to move the protrusion radially in and out, the finger and protrusion structured and arranged to couple a corrugated pipe to the sleeve;
wherein the inner ribs comprise inner projections, the inner ribs each having a first end and a second end, with the first end being between the sleeve free end and the rib second end, the rib first end being rounded;
wherein the outer ribs comprise outer projections, the outer ribs comprising a sloped surface that is sloped toward the central axis in the direction of the sleeve free end;
wherein the at least one of the ribs comprise projections, each of the projections comprising first and second steps, with the second step projecting radially further than the first step;
wherein at least one of the outer ribs has a first end portion and a second end portion, with the second end portion located between the sleeve fixed end and the at least one outer rib first end portion, the at least one outer rib having a second projection extending radially out and located at the at least one outer rib second end portion, the second projection forming a fixed catch for corrugated pipe, the second projection having a radius where the second projection extends from the at least one outer rib such that when a pipe is fitted onto the sleeve, the pipe encounters the radius before encountering the remainder of the second projection;
wherein the finger protrusion is a first protrusion that protrudes radially in, the finger protrusion further comprising a second protrusion that protrudes radially out.

2. The drain basin of claim 1, wherein the basin has a top end that receives a grate.

3. The drain basin of claim 1, wherein the inner and outer ribs comprise projections, each of the projections comprising first and second steps, with the second step projecting radially further than the first step.

4. The drain basin of claim 1 wherein the at least one outer rib is sloped toward the central axis in the direction of the free end.

\* \* \* \* \*